US010223747B2

(12) United States Patent
Gilbert et al.

(10) Patent No.: US 10,223,747 B2
(45) Date of Patent: Mar. 5, 2019

(54) CONTROLLING TRADERS FROM MANIPULATING ELECTRONIC TRADING MARKETS

(71) Applicant: BGC Partners, Inc., New York, NY (US)

(72) Inventors: Andrew C. Gilbert, Califon, NY (US); Andrew Stergiopoulos, New York, NY (US); William P. Tselepis, New Providence, NJ (US)

(73) Assignee: BGC PARTNERS, INC., New York, NY (US)

( * ) Notice: Subject to any disclaimer, the term of this patent is extended or adjusted under 35 U.S.C. 154(b) by 1322 days.

(21) Appl. No.: 14/286,051

(22) Filed: May 23, 2014

(65) Prior Publication Data

US 2014/0258078 A1 Sep. 11, 2014

Related U.S. Application Data

(60) Continuation of application No. 12/335,951, filed on Dec. 16, 2008, now Pat. No. 8,738,501, which is a continuation of application No. 12/031,843, filed on Feb. 15, 2008, now Pat. No. 8,725,623, which is a
(Continued)

(51) Int. Cl.
*G06Q 40/00* (2012.01)
*G06Q 40/04* (2012.01)
*G06Q 40/06* (2012.01)
*G06Q 50/18* (2012.01)

(52) U.S. Cl.
CPC ............ *G06Q 40/04* (2013.01); *G06Q 40/06* (2013.01); *G06Q 50/188* (2013.01)

(58) Field of Classification Search
None
See application file for complete search history.

(56) References Cited

U.S. PATENT DOCUMENTS

| 2,134,118 A | 10/1938 | Foss |
| 3,249,919 A | 5/1966 | Scantlin |
| 3,541,526 A | 11/1970 | Levy et al. |
(Continued)

FOREIGN PATENT DOCUMENTS

| AU | 691467 | 5/1998 |
| DE | 19606467 | 8/1997 |
(Continued)

OTHER PUBLICATIONS

Anderson et al., Hedging with a put option, Texas Agricultural Extension Services, The Texas A&M University System, Jun. 1998, pp. 1-4.*
(Continued)

*Primary Examiner* — Olabode Akintola (57) ABSTRACT

Systems and methods are provided to control gaming in electronic trading markets. These systems and methods alleviate the problem of a seller or buyer trying to act on a trader's original bid or offer only to trade at an unfavorable level after the trader changes the bid or offer. A pricing method suspends trading for a period of time if a price difference between two bids or offers by the same trader is too great. A timing method prevents a trader from canceling or replacing a bid or offer for a period of time. These methods provide a more fair and efficient way of executing electronic trades.

27 Claims, 6 Drawing Sheets

Related U.S. Application Data division of application No. 09/851,848, filed on May 9, 2001, now Pat. No. 7,392,217.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,656,148 A | 4/1972 | Belcher et al. |
| D225,858 S | 1/1973 | Kline |
| 3,976,840 A | 8/1976 | Cleveland et al. |
| 4,141,001 A | 2/1979 | Suzuki et al. |
| 4,412,287 A | 10/1983 | Braddock, III |
| 4,551,717 A | 11/1985 | Dreher |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,903,201 A | 2/1990 | Wagner |
| 4,906,117 A | 3/1990 | Birdwell |
| D308,693 S | 6/1990 | Sakaguchi et al. |
| 4,951,196 A | 8/1990 | Jackson |
| 4,980,826 A | 12/1990 | Wagner |
| 5,038,284 A | 8/1991 | Kramer |
| 5,077,665 A | 12/1991 | Silverman et al. |
| 5,101,353 A | 3/1992 | Lupien et al. |
| D327,057 S | 6/1992 | Gosch |
| 5,136,501 A | 8/1992 | Silverman et al. |
| 5,150,118 A | 9/1992 | Finkle et al. |
| 5,168,446 A | 12/1992 | Wiseman |
| 5,181,809 A | 1/1993 | Martin |
| 5,193,924 A | 3/1993 | Larson |
| 5,195,031 A | 3/1993 | Ordish |
| D335,660 S | 5/1993 | Busch |
| 5,243,331 A * | 9/1993 | McCausland .......... G06Q 40/04 340/4.5 |
| 5,253,940 A | 10/1993 | Abecassis |
| 5,258,908 A | 11/1993 | Hartheimer et al. |
| 5,297,031 A | 3/1994 | Gutterman |
| 5,297,032 A | 3/1994 | Trojan et al. |
| 5,305,200 A | 4/1994 | Hartheimer et al. |
| 5,339,392 A | 8/1994 | Risberg et al. |
| 5,347,452 A | 9/1994 | Bay, Jr. |
| 5,361,199 A | 11/1994 | Shoquist et al. |
| 5,367,298 A | 11/1994 | Axthelm |
| 5,373,055 A | 12/1994 | Ohmae et al. |
| 5,375,055 A | 12/1994 | Togher et al. |
| 5,463,547 A | 10/1995 | Markowtiz et al. |
| 5,579,002 A | 11/1996 | Iggulden et al. |
| 5,615,109 A | 3/1997 | Eder |
| 5,640,569 A | 8/1997 | Miller et al. |
| 5,667,319 A | 9/1997 | Satloff |
| 5,668,358 A | 9/1997 | Wolf et al. |
| 5,689,652 A | 11/1997 | Lupien et al. |
| 5,710,889 A | 1/1998 | Clark et al. |
| 5,715,402 A | 2/1998 | Popolo |
| 5,717,989 A | 2/1998 | Tozzoli et al. |
| 5,727,165 A | 3/1998 | Ordish et al. |
| 5,757,292 A | 5/1998 | Amro et al. |
| 5,774,880 A | 6/1998 | Ginsberg |
| 5,787,402 A | 7/1998 | Potter et al. |
| 5,794,207 A | 8/1998 | Walker et al. |
| 5,794,219 A | 8/1998 | Brown |
| 5,802,497 A | 9/1998 | Manasse |
| 5,826,244 A | 10/1998 | Huberman |
| 5,832,462 A | 11/1998 | Midorikawa et al. |
| 5,835,896 A | 11/1998 | Fisher et al. |
| 5,842,178 A | 11/1998 | Giovannoli |
| 5,845,261 A | 12/1998 | McAbian |
| 5,845,266 A | 12/1998 | Lupien |
| 5,873,071 A | 2/1999 | Ferstenberg et al. |
| 5,878,139 A | 3/1999 | Rosen |
| 5,905,974 A * | 5/1999 | Fraser .................... G06Q 30/06 705/35 |
| 5,905,975 A | 5/1999 | Ausubel |
| 5,914,715 A | 6/1999 | Sasaki |
| 5,915,209 A | 6/1999 | Lawrence |
| 5,890,138 A | 7/1999 | Godin |
| 5,924,082 A | 7/1999 | Silverman et al. |
| 5,926,801 A | 7/1999 | Matsubara et al. |
| 5,950,176 A | 9/1999 | Keiser et al. |
| 5,963,923 A | 10/1999 | Garber |
| 5,987,419 A | 11/1999 | Hachino et al. |
| 6,012,040 A | 1/2000 | Goodwin, III |
| 6,014,627 A | 1/2000 | Togher et al. |
| 6,016,483 A | 1/2000 | Richard et al. |
| 6,029,146 A | 2/2000 | Hawkins et al. |
| 6,055,504 A | 4/2000 | Chou et al. |
| 6,085,168 A | 7/2000 | Mori et al. |
| 6,098,051 A | 8/2000 | Lupien et al. |
| 6,115,698 A | 9/2000 | Tuck |
| 6,119,101 A | 9/2000 | Peckover |
| 6,131,085 A | 10/2000 | Rossides |
| 6,134,535 A | 10/2000 | Belzberg |
| 6,141,653 A | 10/2000 | Conklin et al. |
| 6,151,588 A | 11/2000 | Tozzoli et al. |
| 6,195,647 B1 | 2/2001 | Martyn et al. |
| 6,199,050 B1 | 3/2001 | Alaia et al. |
| 6,211,880 B1 | 4/2001 | Impink, Jr. |
| 6,230,146 B1 | 5/2001 | Alaia et al. |
| 6,230,147 B1 * | 5/2001 | Alaia ................ G06Q 30/0601 705/26.3 |
| 6,243,691 B1 | 6/2001 | Fisher et al. |
| 6,247,000 B1 | 6/2001 | Hawkins et al. |
| 6,259,044 B1 | 7/2001 | Paratore et al. |
| 6,263,321 B1 | 7/2001 | Daughtery, III |
| 6,272,474 B1 | 8/2001 | Garcia |
| 6,278,982 B1 | 8/2001 | Korhammer et al. |
| 6,282,521 B1 | 8/2001 | Howorka |
| 6,311,178 B1 | 10/2001 | Bi et al. |
| 6,317,727 B1 | 11/2001 | May |
| 6,317,728 B1 | 11/2001 | Kane |
| 6,343,278 B1 | 1/2002 | Jain et al. |
| 6,363,365 B1 | 3/2002 | Kou |
| 6,405,180 B2 | 6/2002 | Tilfors et al. |
| 6,421,653 B1 | 7/2002 | May |
| 6,434,536 B1 | 8/2002 | Geiger |
| 6,438,575 B1 | 8/2002 | Khan et al. |
| 6,477,513 B1 | 11/2002 | Walker et al. |
| 6,505,174 B1 | 1/2003 | Keiser et al. |
| 6,510,418 B1 | 1/2003 | Case et al. |
| 6,519,574 B1 | 2/2003 | Wilton et al. |
| 6,560,580 B1 | 5/2003 | Fraser et al. |
| 6,625,583 B1 | 9/2003 | Silverman et al. |
| 6,629,082 B1 | 9/2003 | Hambrecht |
| D491,944 S | 6/2004 | Lutnick et al. |
| 6,772,132 B1 | 8/2004 | Kemp, II et al. |
| D496,663 S | 9/2004 | Lutnick et al. |
| D497,912 S | 11/2004 | Lutnick et al. |
| D498,476 S | 11/2004 | Lutnick et al. |
| 6,823,318 B1 | 11/2004 | Creswell et al. |
| 6,850,907 B2 | 2/2005 | Lutnick et al. |
| D502,467 S | 3/2005 | Lutnick et al. |
| D503,712 S | 4/2005 | Lutnick et al. |
| D503,713 S | 4/2005 | Lutnick et al. |
| D503,935 S | 4/2005 | Lutnick et al. |
| D504,131 S | 4/2005 | Lutnick et al. |
| 6,903,662 B2 | 6/2005 | Rix et al. |
| 6,912,126 B2 | 6/2005 | Rudd et al. |
| 6,963,856 B2 | 11/2005 | Lutnick et al. |
| 6,965,511 B2 | 11/2005 | Rudd et al. |
| D516,072 S | 2/2006 | Lutnick et al. |
| 7,000,181 B2 | 2/2006 | Press |
| 7,003,488 B2 | 2/2006 | Dunne et al. |
| 7,076,461 B2 | 7/2006 | Balaban |
| 7,080,033 B2 | 7/2006 | Wilton et al. |
| 7,157,651 B2 | 1/2007 | Rix et al. |
| 7,243,083 B2 | 7/2007 | Burns et al. |
| 7,283,067 B2 | 10/2007 | Lutnick et al. |
| 7,392,212 B2 | 6/2008 | Hancock et al. |
| 7,392,214 B1 | 6/2008 | Fraser et al. |
| 7,392,217 B2 | 6/2008 | Gilbert et al. |
| 7,400,270 B2 | 7/2008 | Lutnick et al. |
| 7,496,533 B1 | 2/2009 | Keith |

(56) References Cited

U.S. PATENT DOCUMENTS

| | | |
|---|---|---|
| 7,523,064 B2 | 4/2009 | Burns et al. |
| 7,552,084 B2 | 6/2009 | Fraser et al. |
| 7,617,144 B2 | 11/2009 | Madoff et al. |
| 7,617,145 B1 | 11/2009 | Peterson |
| 7,734,529 B1 | 6/2010 | Zhou |
| 7,769,668 B2 | 8/2010 | Balabon |
| 7,822,672 B2 | 10/2010 | Hausman |
| 7,941,364 B2 | 5/2011 | Peterffy et al. |
| 2001/0003179 A1 | 6/2001 | Martyn et al. |
| 2001/0032175 A1 | 10/2001 | Holden et al. |
| 2001/0037279 A1 | 11/2001 | Yeo |
| 2002/0023037 A1 | 2/2002 | White |
| 2002/0023042 A1 | 2/2002 | Solomon |
| 2002/0026321 A1 | 2/2002 | Faris et al. |
| 2002/0029180 A1 | 3/2002 | Kirwin et al. |
| 2002/0070915 A1 | 6/2002 | Mazza et al. |
| 2002/0073014 A1 | 6/2002 | Gilbert |
| 2002/0082976 A1 | 6/2002 | Howorka |
| 2002/0091626 A1 | 7/2002 | Johnson et al. |
| 2002/0107784 A1 | 8/2002 | Hancock et al. |
| 2002/0128945 A1 | 9/2002 | Moss et al. |
| 2002/0133456 A1 | 9/2002 | Lancaster et al. |
| 2002/0143690 A1 | 10/2002 | Mahajan et al. |
| 2002/0154038 A1 | 10/2002 | Houston |
| 2002/0156716 A1 | 10/2002 | Adatia |
| 2002/0161690 A1 | 10/2002 | McCarthy et al. |
| 2002/0169704 A1 | 11/2002 | Gilbert |
| 2002/0178104 A1 | 11/2002 | Hausman |
| 2002/0198815 A1 | 12/2002 | Greifeld et al. |
| 2003/0004862 A1 | 1/2003 | Lutnick et al. |
| 2003/0009411 A1 | 1/2003 | Ram et al. |
| 2003/0033239 A1 | 2/2003 | Gilbert |
| 2003/0050888 A1 | 3/2003 | Satow et al. |
| 2003/0065613 A1 | 4/2003 | Smith |
| 2003/0069826 A1 | 4/2003 | Guidi et al. |
| 2003/0083976 A1 | 5/2003 | McLister |
| 2003/0097323 A1 | 5/2003 | Khalfan et al. |
| 2003/0229571 A1 | 12/2003 | May |
| 2003/0229900 A1 | 12/2003 | Reisman |
| 2003/0236737 A1 | 12/2003 | Kemp et al. |
| 2004/0030634 A1 | 2/2004 | Satow |
| 2004/0034591 A1 | 2/2004 | Waelbroeck et al. |
| 2004/0044610 A1 | 3/2004 | Fraser et al. |
| 2004/0059666 A1 | 3/2004 | Waelbroeck et al. |
| 2004/0117292 A1 | 6/2004 | Brumfield et al. |
| 2004/0117331 A1 | 6/2004 | Lutnick et al. |
| 2004/0122684 A1 | 6/2004 | Kaikuranta |
| 2004/0140998 A1 | 7/2004 | Gravina et al. |
| 2004/0143503 A1 | 7/2004 | Suthar |
| 2004/0143538 A1 | 7/2004 | Korhammer |
| 2004/0158519 A1 | 8/2004 | Lutnick et al. |
| 2004/0193519 A1 | 9/2004 | Sweeting et al. |
| 2004/0204232 A1 | 10/2004 | Asher |
| 2004/0210511 A1 | 10/2004 | Waelbroeck et al. |
| 2004/0210512 A1 | 10/2004 | Fraser et al. |
| 2004/0218963 A1 | 11/2004 | Van Diepen et al. |
| 2004/0243505 A1 | 12/2004 | Sweeting et al. |
| 2005/0004852 A1 | 1/2005 | Whitney |
| 2005/0038731 A1 | 2/2005 | Sweeting et al. |
| 2005/0038732 A1 | 2/2005 | Sweeting et al. |
| 2005/0055304 A1 | 3/2005 | Lutnick et al. |
| 2005/0075966 A1 | 4/2005 | Duka |
| 2005/0108079 A1 | 5/2005 | Langridge |
| 2005/0108653 A1 | 5/2005 | Langridge |
| 2005/0119966 A1 | 6/2005 | Sandholm et al. |
| 2005/0160032 A1 | 7/2005 | Lutnick et al. |
| 2005/0171895 A1 | 8/2005 | Howorka et al. |
| 2005/0216393 A1 | 9/2005 | Lutnick et al. |
| 2005/0222941 A1 | 10/2005 | Tull, Jr. |
| 2006/0007160 A1 | 1/2006 | Lutnick et al. |
| 2006/0010066 A1 | 1/2006 | Rosenthal |
| 2006/0059079 A1 | 3/2006 | Howorka |
| 2006/0069635 A1 | 3/2006 | Ram et al. |
| 2006/0080214 A1 | 4/2006 | Hausman et al. |
| 2006/0086726 A1 | 4/2006 | Yamamoto et al. |
| 2006/0218072 A1 | 9/2006 | Noviello |
| 2006/0229967 A1 | 10/2006 | Sweeting |
| 2006/0265304 A1 | 11/2006 | Brumfield et al. |
| 2006/0265305 A1 | 11/2006 | Schluetter et al. |
| 2006/0271475 A1 | 11/2006 | Brumfield et al. |
| 2006/0277136 A1 | 12/2006 | O'Connor et al. |
| 2007/0100735 A1 | 5/2007 | Kemp et al. |
| 2007/0150708 A1 | 6/2007 | Billeci |
| 2007/0168275 A1 | 7/2007 | Busby et al. |
| 2007/0174162 A1 | 7/2007 | Lutnick et al. |
| 2007/0226120 A1 | 9/2007 | Nanjundamoorthy |
| 2007/0244795 A1 | 10/2007 | Lutnick et al. |
| 2007/0244796 A1 | 10/2007 | Lutnick et al. |
| 2007/0250438 A1 | 10/2007 | Fraser et al. |
| 2007/0255642 A1 | 11/2007 | Keith |
| 2008/0071671 A1 | 3/2008 | Fraser et al. |
| 2008/0077523 A1 | 3/2008 | Fraser et al. |
| 2008/0133401 A1 | 6/2008 | Gilbert |
| 2008/0140558 A1 | 6/2008 | Reuter et al. |
| 2009/0073004 A1 | 3/2009 | Lutnick et al. |
| 2009/0099973 A1 | 4/2009 | Gilbert |
| 2009/0229119 A1 | 9/2009 | Daily et al. |
| 2011/0066536 A1 | 3/2011 | Milne |
| 2012/0278223 A1 | 11/2012 | Lutnick et al. |
| 2013/0132250 A1 | 5/2013 | Fraser et al. |
| 2013/0132251 A1 | 5/2013 | Fraser et al. |
| 2013/0132254 A1 | 5/2013 | Fraser et al. |

FOREIGN PATENT DOCUMENTS

| | | |
|---|---|---|
| EP | 399850 | 11/1990 |
| EP | 0412308 | 2/1991 |
| EP | 0416482 | 3/1991 |
| EP | 0512702 | 11/1992 |
| EP | 0733963 B1 | 9/1996 |
| EP | 0828223 A2 | 3/1998 |
| EP | 0993995 B1 | 4/2000 |
| EP | 1006472 | 6/2000 |
| GB | 2256954 A | 12/1992 |
| GB | 2258061 | 1/1993 |
| GB | 2313276 | 11/1997 |
| JP | 358161068 | 9/1983 |
| JP | 59184929 | 10/1984 |
| JP | 59-195779 | 11/1984 |
| JP | 62-256164 | 11/1987 |
| JP | 6-251021 | 9/1994 |
| JP | 3036207 | 4/1997 |
| JP | 11-282600 | 3/1998 |
| JP | 10-504409 | 4/1998 |
| JP | 2768828 | 6/1998 |
| JP | 10-320494 | 12/1998 |
| JP | 2003-525480 | 4/2000 |
| JP | 2002-032565 | 7/2000 |
| JP | 2001-501333 | 1/2001 |
| KR | 1992-700435 | 2/1992 |
| WO | WO 1985/004271 | 9/1985 |
| WO | WO 1987/003115 | 5/1987 |
| WO | WO 1993/15467 | 8/1993 |
| WO | WO 1995/006918 | 3/1995 |
| WO | WO 1995/026005 | 9/1995 |
| WO | WO 1996/005563 A1 | 2/1996 |
| WO | WO 1996/034356 | 10/1996 |
| WO | WO 1997/37315 | 10/1997 |
| WO | WO 1998/026363 | 6/1998 |
| WO | WO 1998/034187 | 8/1998 |
| WO | WO 1998/041942 | 9/1998 |
| WO | WO 1998/049639 | 11/1998 |
| WO | WO 1998/52133 | 11/1998 |
| WO | WO 1999/019821 | 4/1999 |
| WO | WO 00/11588 | 3/2000 |
| WO | WO 2000/067172 | 4/2000 |
| WO | WO 2000/026745 | 5/2000 |
| WO | WO 2001/50317 | 12/2000 |
| WO | WO 2001/069366 | 9/2001 |
| WO | WO 2003/026135 | 3/2003 |

(56) References Cited

FOREIGN PATENT DOCUMENTS

| WO | WO 2004/057440 | 7/2004 |
|---|---|---|
| WO | WO 2006108158 | 4/2006 |

OTHER PUBLICATIONS

Netessine, S., Dynamic pricing of inventory/capacity with infrequent price changes. The Wharton School, University of Pennsylvania, Sep. 2003, pp. 1-32.*
Menzl, Vojtech, Czech Republic—Environmental Protection Equipment, National Trade Data Bank Market Reports, Jul. 13, 1995 (pp. 1-60).
Munnell, Alicia H., et. al., *Mortgage Lending in Boston: Interpreting HMDA Data*, The American Economic Review, vol. 86, No. 1, Mar. 1996 (30 pages).
Ebay, eBay, Inc., at http://ebay.com, printed Mar. 29, 2005 (2 pages).
Sanchez, Rene, "One-Sex-Only Clubs Come Under Attack Nationwide; D.C. Antibias Law Similar to Many Others," The Washington Post, Oct. 13, 1987 (4 pages).
USPTO Office Action for U.S. Appl. No. 11/947,285, dated Apr. 24, 2008 (16 pages).
U.S. Notice of Allowance for U.S. Appl. No. 11/760,508; 9 pages; dated Jun. 2, 2014.
USPTO Office Action for U.S. Appl. No. 10/829,119, dated Dec. 13, 2007 (8 pages).
USPTO Office Action for U.S. Appl. No. 10/829,119, dated Jan. 30, 2007 (11 pages).
USPTO Office Action for U.S. Appl. No. 10/829,119, dated Sep. 14, 2007 (12 pages).
USPTO Office Action for U.S. Appl. No. 10/829,119, dated Jun. 18, 2008 (10 pages).
USPTO Office Action for U.S. Appl. No. 09/553,423, dated Oct. 17, 2003; 5 Pages.
USPTO Office Action for U.S. Appl. No. 09/553,423, dated Oct. 21, 2003; 6 Pages.
USPTO Office Action for U.S. Appl. No. 09/553,423, dated Jun. 18, 2004; 5 Pages.
USPTO Office Action for U.S. Appl. No. 09/553,423, dated Feb. 1, 2005; 7 Pages.
USPTO Office Action for U.S. Appl. No. 09/553,423, dated Nov. 3, 2005; 6 Pages.
USPTO Office Action for U.S. Appl. No. 09/553,423, dated Oct. 13, 2006; 13 Pages.
USPTO Office Action for U.S. Appl. No. 09/553,423, dated Jun. 22, 2007; 14 Pages.
USPTO Office Action for U.S. Appl. No. 09/553,423, dated May 4, 2006; 9 Pages.
USPTO Office Action for U.S. Appl. No. 09/553,423, dated Apr. 22, 2003; 5 Pages.
USPTO Office Action for U.S. Appl. No. 09/851,848, dated Jun. 19, 2006; 8 pages.
USPTO Office Action for U.S. Appl. No. 09/851,848, dated Sep. 25, 2006; 6 pages.
USPTO Office Action for U.S. Appl. No. 09/851,848, dated Aug. 22, 2007; 7 pages.
USPTO Office Action for U.S. Appl. No. 09/851,848, dated Feb. 8, 2007; 8 pages.
USPTO Office Action for U.S. Appl. No. 08/766,733, dated May 21, 1998.
USPTO Notice of Allowance for U.S. Appl. No. 08/766,733, dated Sep. 1, 1998.
USPTO Office Action for U.S. Appl. No. 10/147,218, dated Dec. 10, 2007 (4 pages).
USPTO Office Action for U.S. Appl. No. 10/147,218, dated Jan. 3, 2007 (5 pages).
USPTO Office Action for U.S. Appl. No. 10/699,859, dated Sep. 19, 2007 (13 pages).
USPTO Office Action for U.S. Appl. No. 10/699,859, dated May 22, 2008 (16 pages).
USPTO Advisory Action for U.S. Appl. No. 10/699,859, dated Jul. 3, 2008 (3 pages).
USPTO Office Action for U.S. Appl. No. 10/715,081, dated Aug. 10, 2007 (12 pages).
USPTO Office Action for U.S. Appl. No. 10/715,081, dated Mar. 3, 2008 (16 pages).
USPTO Advisory Action for U.S. Appl. No. 10/715,081, dated Mar. 28, 2008 (3 pages).
USPTO Office Action for U.S. Appl. No. 10/715,081, dated Apr. 30, 2008 (16 pages).
USPTO Office Action for U.S. Appl. No. 10/759,957, dated Aug. 20, 2007 (11 pages).
USPTO Office Action for U.S. Appl. No. 10/759,957, dated Feb. 28, 2008 (15 pages).
USPTO Advisory Action for U.S. Appl. No. 10/759,957, dated Mar. 28, 2008 (3 pages).
USPTO Office Action for U.S. Appl. No. 10/759,957, dated May 1, 2008 (15 pages).
USPTO Office Action for U.S. Appl. No. 11/080,322, dated Jul. 25, 2008 (16 pages).
USPTO Notice of Allowance for U.S. Appl. No. 11/126,781, dated Aug. 9, 2007 (4 pages).
USPTO Office Action for U.S. Appl. No. 10/699,858, dated Feb. 25, 2008 (8 pages).
USPTO Office Action for U.S. Appl. No. 11/328,814, dated Apr. 10, 2009; 9 pages.
USPTO Office Action for U.S. Appl. No. 10/699,858, dated May 6, 2009; 8 pages.
USPTO Office Action for U.S. Appl. No. 11/621,546, dated May 5, 2009; 17 pages.
USPTO Office Action for U.S. Appl. No. 11/080,322, dated Apr. 16, 2009; 10 pages.
USPTO Office Action for U.S. Appl. No. 09/859,661, dated Mar. 4, 2009; 3 pages.
USPTO Office Action for U.S. Appl. No. 10/382,527, dated May 12, 2009; 8 pages.
USPTO Office Action for U.S. Appl. No. 10/715,081, dated Feb. 2, 2009; 22 pages.
USPTO Office Action for U.S. Appl. No. 10/759,957, dated Feb. 2, 2009; 20 pages.
MAOI Technologies Announces IIVEeXCHANGE 2.1, PR Newswire, New York, Sep. 14, 1998, p. 1. Retrieved from ProQuest.
Australian Examiners Report for AU Application No. 2007204680; 5 pages; dated Dec. 5, 2008.
Enabling the "Disabled": Technologies for People with Handicaps. Wagner, Cynthia G. The Futurist. Washington: May/Jun. 1992. vol. 26, Iss. 3; p. 29, 4.
Datadesk Ships Switchboard; First User-Configurable Keyboard for Both IBM PCs and Macintosh Computers, Allows Users to Customize Keyboard, Add Input Devices. Brehm, Michaela, Jaker, Claudia. Business Wire. New York: Jun. 26, 1990. Sec. 1. p. 1.
Datadesk's User-Configurable Keyboard Allows Users to Customize Layout, Add Input Devices. Jaker, Claudia, Brehm, Michaela. Business Wire. New York: Apr. 3, 1990. Sec. 1. p. 1.
USPTO Office Action for U.S. Appl. No. 10/699,858, dated Dec. 15, 2008 (6 pages).
USPTO Examiner Interview Summary for U.S. Appl. No. 10/699,858, dated Oct. 5, 2009 (3 pages).
USPTO Office Action for U.S. Appl. No. 10/699,859, dated Jun. 25, 2009 (17 pages).
JP Office Action for JP Application No. 2000-590084; dated Oct. 22, 2009; 31 pages.
AU Examiner Report for AU Application No. 2005208492; 5 pages; dated Nov. 20, 2009.
Notice of Allowance for U.S. Appl. No. 11/621,546; 7 pages; dated Jan. 12, 2010.
USPTO Office Action for U.S. Appl. No. 09/859,661; dated Dec. 14, 2009; 10 pages.
Google Definitions of protocol downloaded Dec. 4, 2009.
Merriam-Webster definition of "state" (noun), downloaded Dec. 4, 2009.

(56) References Cited

OTHER PUBLICATIONS

USPTO Pre-Brief Appeal Conference Decision for U.S. Appl. No. 10/699,858, Dec. 9, 2009 (2 pages).
USPTO Office Action for U.S. Appl. No. 10/699,858, dated Apr. 12, 2010 (8 pages).
Notice of Allowance for U.S. Appl. No. 11/080,322; 7 pages; dated Feb. 26, 2010.
Notice of Allowance for U.S. Appl. No. 10/759,957; dated Mar. 2, 2010; 4 pages.
Notice of Allowance for U.S. Appl. No. 10/715,081; dated Mar. 1, 2010; 4 pages.
Futures, "Guide to Computerized Trading 2003", vol. XXXII, No. 8, 2003; pp. 1-5.
U.S. PTO Office Action for U.S. Appl. No. 11/760,508; 16 pages; dated Apr. 13, 2010.
U.S. PTO Office Action for U.S. Appl. No. 11/947,231; 7 pages; dated Apr. 15, 2010.
U.S. Appl. No. 12/051,708, filed Mar. 19, 2008; 16 pages.
U.S. PTO Office Action for U.S. Appl. No. 12/051,708 dated Apr. 30, 2010; 6 pages.
AU Examiner Report for AU Application No. 2007204680; 4 pages; dated Aug. 11, 2010.
EP Office Action for Application No. 07710023.8; 6 pages; dated Jul. 5, 2010.
Notice of Allowance for U.S. Appl. No. 11/328,814; 7 pages; dated Aug. 11, 2010.
Notice of Allowance for U.S. Appl. No. 11/215,236 dated Sep. 1, 2010; 7 pages.
Office Action for U.S. Appl. No. 11/215,236 dated Nov. 24, 2009; 15 pages.
Decision for U.K. Application No. 0517644.1 dated Nov. 19, 2010; 17 pages.
Office Action for U.K. Application No. 0517644.1 dated Nov. 2, 2009; 5 pages.
Canadian Office Action for Application No. 2506980 dated Aug. 12, 2010; 2 pages.
USPTO Office Action for U.S. Appl. No. 09/859,661, dated Aug. 13, 2010; 11 pages.
Definition of "protocol", Merriam-Webster Online Dictionary, downloaded Aug. 11, 2010.
U.S. PTO Office Action for U.S. Appl. No. 12/335,951 dated Aug. 30, 2010; 4 pages.
U.S. Appl. No. 09/851,848, filed May 9, 2001; 17 pages.
Notice of Allowance for U.S. Appl. No. 09/851,848 dated Apr. 25, 2008; 7 pages.
PCT Search Report for PCT Application No. PCT/US02/14825 dated Feb. 25, 2003; 4 pages.
Notice of Allowance for U.S. Appl. No. 12/031,843 dated Sep. 17, 2010; 10 pages.
PCT International Preliminary Examination Report for Application No. PCT/US02/14825 dated Dec. 13, 2005; 4 pages.
UK Examiner Report for Application No. 0326273.0 dated Jul. 23, 2004; 3 pages.
UK Examiner Report for Application No. 0326273.0 dated Jul. 11, 2005; 7 pages.
Notice of Allowance for U.S. Appl. No. 11/947,231 dated Dec. 1, 2010; 8 pages.
Notice of Allowance for U.S. Appl. No. 11/947,347 dated Nov. 29, 2010; 12 pages.
"Specialist vs. Saitori: Market-Making in New York and Tokyo"; Lindsey, Richard R., Schaede, Ulrike. Financial Analysts Journal. Charlottesville: Jul./Aug. 1992. vol. 48, Iss. 4; p. 48, 10 pgs.
"Lowering exposure to counterparty failure;" Julio Bucatinsky. Wall Street & Technology. New York: Jul. 1998. vol. 16, Issue 7; p. 110, 3 pages.
"Price Quantity Strategic Market games"; Author(s): Pradeep Dubey; Econometrica, vol. 50, No. 1 (Jan. 1982), pp. 111-126.
Notice of Allowance for U.S. Appl. No. 11/215,236 dated Dec. 1, 2010; 7 pages.
Notice of Allowance for U.S. Appl. No. 11/215,236 dated Aug. 20, 2010; 8 pages.
U.S. PTO Office Action for U.S. Appl. No. 11/760,508; 19 pages; dated Dec. 21, 2010.
AU Examination Report for Application No. 2010200080 dated Nov. 23, 2010; 2 pages.
AU Examiner Report for AU Application N0. 2005208492; 3 pages; dated Feb. 28, 2011.
AU Examiner Report for AU Application N0. 2010214769; 2 pages; dated Apr. 7, 2011.
JP Office Action for JP Application No. 2000-590084; dated Mar. 17, 2011; 5 pages (includes English Translation).
USPTO Office Action for U.S. Appl. No. 12/335,951, dated May 6, 2011; 5 pages.
Notice of Allowance for U.S. Appl. No. 11/947,231 dated Apr. 21, 2011; 6 pages.
Notice of Allowance for U.S. Appl. No. 11/215,236 dated Mar. 29, 2011; 25 pages.
Notice of Allowance for U.S. Appl. No. 11/947,347 dated Mar. 10, 2011; 13 pages.
EP Office Action for Application No. 05252856.9; 9 pages; dated Aug. 10, 2006.
JP Office Action for JP Application No. 2006-549572; dated May 18, 2010; 9 pages (includes English Translation).
EP Office Action for Application No. 03256926.1 dated Aug. 16, 2010; 6 pages.
Canadian Office Action for Application No. 2251259 dated May 3, 2010; 9 pages.
Canadian Office Action for Application No. 2354081 dated Jul. 2, 2009; 4 pages.
Brazilian Office Action for Application No. PI9916808-1 dated Feb. 1, 2011; 4 pages.
Canadian Office Action for Application No. 2493971 dated Apr. 7, 2009; 6 pages.
Canadian Office Action for Application No. 2371673 dated Feb. 12, 2010; 3 pages.
Chinese Office Action for Application No. 200510134147.0 dated May 9, 2011; 11 pages.
Notice of Allowance for U.S. Appl. No. 11/947,347; dated Jun. 27, 2011; 19 pages.
Au Examination Report for Application No. 2009238246 dated Jun. 1, 2011; 2 pages.
AU Second Examination Report for Application No. 2010214769; 2 pages.
Notice of Allowance for U.S. Appl. No. 11/215,236 dated Jul. 29, 2011; 9 pages.
Notice of Allowance for U.S. Appl. No. 11/947,231 dated Aug. 5, 2011; 15 pages.
JP Office Action for JP Application No. 2008-549691; dated Jul. 19, 2011; 8 pages (including English Translation.
Brazilian Second Office Action for Application No. PI9916808-1 dated Aug. 18, 2011; 5 pages (includes English Translation).
Decision on Appeal for PTO Office Action for Application No. 10/829,119; dated Oct. 11, 2011; 10 pages.
Notice of Allowance for U.S. Appl. No. 11/215,236 dated Nov. 14, 2011; 8 pages.
Notice of Allowance for U.S. Appl. No. 11/947,347 dated Nov. 1, 2011; 12 pages.
Notice of Allowance for U.S. Appl. No. 11/947,231 dated Nov. 23, 2011; 7 pages.
Notice of Allowance for U.S. Appl. No. 11/947,231 dated Nov. 28, 2011; 35 pages.
Notice of Allowance for U.S. Appl. No. 12/335,951 dated Dec. 1, 2011; 9 pages.
Notice of Allowance for U.S. Appl. No. 12/031,843 dated Nov. 15, 2011; 32 pages.
Notice of Panel Decision for U.S. Appl. No. 11/760,508; 2 pages; Jul. 20, 2011.
Korean Patent Office Action for Application No. 10-2001-7007716 dated Jun. 29, 2006; 24 pages.
Chinese Office Action for Application No. 200510134147.0 dated Dec. 6, 2011; 10 pages.

(56) References Cited

OTHER PUBLICATIONS

Notice of Allowance for U.S. Appl. No. 11/215,236; dated Mar. 2, 2012; 13 pages.
Notice of Allowance for U.S. Appl. No. 11/947,231 dated Mar. 8, 2012; 10 pages.
Canadian Office Action for Application No. 2493971 dated Feb. 21, 2012; 7 pages.
JP Office Action for JP Application No. 2000-590084; dated Mar. 2, 2012; 5 pages (includes English Translation).
U.S. PTO Notice of Allowance for U.S. Appl. No. 10/829,119; dated Mar. 19, 2012; 10 pages.
Notice of Allowance for U.S. Appl. No. 11/947,347 dated Feb. 8, 2012; 12 pages.
U.S. PTO Office Action for U.S. Appl. No. 10/382,527; 8 pages; dated Apr. 9, 2012.
Canadian Office Action for Application No. 2371673 dated Feb. 10, 2012; 2 pages.
Notice of Allowance for U.S. Appl. No. 10/382,527 dated Nov. 16, 2012; 5 pages.
U.S. PTO Notice of Allowance for U.S. Appl. No. 10/382,527; 6 pages; dated Dec. 1, 2009.
USPTO Office Action for U.S. Appl. No. 09/859,661; 11 pages; dated Sep. 6, 2012.
Zigas, David, "MSRB Rule Would Require Buyers to Accept Some Partial Deliveries" The Bond Buyer—May 16, 1983, Monday; p. 32.
Litigation Search Report Produced by the USPTO STIC, Jun. 6, 2012.
ESpeed v BrokerTec_480 F.3d 1128 (2007)—CAFC, downloaded Aug. 26, 2012.
U.S. PTO Office Action for U.S. Appl. No. 11/080,322; 11 pages; dated Dec. 31, 2012.
JP Office Action for Application No. 2010-099296; 19 pages; dated Sep. 26, 2012.
U.S. PTO Office Action for U.S. Appl. No. 13/543,926; 19 pages; dated Aug. 2, 2012.
U.S. PTO Office Action for U.S. Appl. No. 13/555,273; 11 pages; dated Apr. 3, 2013.
U.S. PTO Office Action for U.S. Appl. No. 13/543,926; 20 pages; dated Apr. 9, 2013.
U.S. PTO Notice of Allowance for U.S. Appl. No. 10/382,527; 6 pages; dated May 2, 2013.
U.S. Office Action U.S. Appl. No. 11/760,508; 8 pages; dated May 28, 2013.
CA Supplemental Analysis for CA App. No. 2,493,971; 32 pages; Jun. 28, 2013.
CA Examiner's Report for CA App. No. 2,354,081; 9 pages; dated Apr. 22, 2013.
CA Final Examiners Requisition for CA App. No. 2,251,259; 7 pages; May 23, 2013.
JP Office Action for JP App. No. 2011-205174; 2 pages; dated Feb. 4, 2013 (w/ English translation).
U.S. Office Action U.S. Appl. No. 13/550,011; 6 pages; dated Jul. 12, 2013.
U.S. Office Action U.S. Appl. No. 13/616,786; 6 pages; dated Jun. 13, 2013.
CA Examiner's Report for CA App. No. 2,371,673; 9 pages; dated Jun. 10, 2013.
U.S. PTO Notice of Allowance for U.S. Appl. No. 10/382,527; 6 pages; dated Aug. 23, 2013.
JP Office Action for JP App. No. 2012-12515; 7 pages; dated Jul. 24, 2013 (w/English translation).
JP Office Action for JP App. No. 2011-205174; 2 pages; dated Aug. 28, 2013.
CA Final Examiners Requisition for CA App. No. 2,251,259; 4 pages; Oct. 16, 2013.
JP Office Action for JP App. No. 2010-099296; 5 pages; dated Nov. 5, 2013 (w/English translation).
U.S. Office Action U.S. Appl. No. 13/550,011; 8 pages; dated Oct. 30, 2013.
U.S. Notice of Allowance for U.S. Appl. No. 13/616,786; 6 pages; dated Oct. 30, 2013.
U.S. Office Action U.S. Appl. No. 11/760,508; 10 pages; dated Dec. 3, 2013.
U.S. PTO Final Office Action for U.S. Appl. No. 11/080,322;5 pages; dated Nov. 21, 2013.
U.S. Notice of Allowance for U.S. Appl. No. 10/3832,527; 11 pages; dated Dec. 11, 2013.
U.S. Notice of Allowance for U.S. Appl. No. 12/031,843; 18 pages; dated Dec. 26, 2013.
U.S. Notice of Allowance for U.S. Appl. No. 12/355,951; 5 pages; dated Jan. 15, 2014.
U.S. Office Action for U.S. Appl. No. 11/947,347 dated Apr. 28, 2010; 10 pages.
CA Examination Report for App. No. 2,518,012; 4 pages; dated Feb. 5, 2014.
U.S. PTO Final Office Action for U.S. Appl. No. 13/555,273;5 pages; dated Feb. 20, 2014.
U.S. Notice of Allowance for U.S. Appl. No. 13/616,786; 8 pages; dated Feb. 24, 2014.
U.S. Notice of Allowance for U.S. Appl. No. 10/3832,527; 6 pages; dated Apr. 8, 2014.
U.S. PTO Office Action for U.S. Appl. No. 13/543,926; dated May 16, 2014; 20 pages.
EP Office Action for App. No. 05255308.8; dated Feb. 11, 2014; 8 pages.
Money Match, Functional Specification, Version 1, The Sequor Group Inc. Software Services Aug. 1990 (87 pages).
USPTO Notice of Allowance and Fees Due for U.S. Appl. No. 09/553,423, dated Feb. 21, 2008 (7 pages).
JP Office Action for App. No. 2012-12515; 15 pages; dated May 15, 2014 (w/English translation).
U.S. Final Office Action for U.S. Appl. No. 13/550,011; 8 pages; dated Jun. 3, 2014.
U.S. Notice of Allowance for U.S. Appl. No. 13/616,786; 8 pages; dated Jun. 18, 2014.
AU Examination Report for App. No. 2013201198; dated Aug. 18, 2014; 3 pages.
AU Examination Report for App. No. 2012216355; dated Sep. 16, 2014; 3 pages.
JP Office Action re Formalities for JP App. No. 2014-042926; 1 page; dated Aug. 10, 2016 (w/English translation).
Canadian Office Action for Application No. 2876825 dated Sep. 14, 2016; 6 pages.
Canadian Office Action for Application No. 2852742 dated Sep. 21, 2016; 10 pages.
CN Office Action for Application No. 200510134147.0 dated Feb. 6, 2017; 11 pages.
AU Examiner Report for AU Application No. 2005208492; 4 pages; dated Aug. 21, 2017.
ESpeed, Inc v Brokertec USA, LLC (79 USPQ 1258; 417 FSupp2d 580) USDC DE, 2006) pp. 1259-1273.
ESpeed, Inc v Brokertec USA, LLC (82 USPQ2d 1183; 480 F3d 1129) (CAFC 2007) pp. 1184-1190.
CA Examiner's Requisition for App. No. 2,354,081; Mar. 20, 2015; 14 pages.
CA Examiner's Requisition for App. No. 2,852,742; dated Oct. 24, 2014; 3 pages.
JP Office Action for App. No. 2010-99296; dated Mar. 31, 2015; 5 pages (w/English translation).
JP Office Action for App. No. 2000-590084; dated Dec. 25, 2014; 9 pages (w/English translation).
JP Office Action for App. No. 2014-042926; dated Sep. 15, 2015; 2 pages.
CA Examiner's Requisition for App. No. 2,518,012; Apr. 9, 2015; 6 pages.
CA Examiner's Requisition for App. No. 2,354,081; Oct. 20, 2015; 12 pages.
CA Examiner's Requisition for App. No. 2,852,742; Oct. 23, 2015; 10 pages.
Hamao et al., "Securities trading in the absence of dealers; Trade and Quotes on the Tokyo Stock Exchange", Working Papers Series, Graduate School of Business, Columbia University, Oct. 1992.

(56) References Cited

OTHER PUBLICATIONS

Ross et al., "Price Improvement of SuperDot Market Orders on the NYSE", NYSE Working paper 96-02, Mar. 11, 1996.
CA Examiner's Requisition for App. No. 2,354,081; Oct. 17, 2016; 16 pages.
CA Examiner's Requisition for App. No. 2518012; Apr. 10, 2017; 6 pages.
EP Summons to Oral Proceedings for App. No. 05255308.8; Apr. 10, 2017; 9 pages.
CA Examiner's Requisition for App. No. 2876825 ; Apr. 18, 2017; 8 pages.
CA Examiner's Requisition for App. No. 2852742 ; May 18, 2017; 12 pages.
EP Decision to Refuse for Application No. 05255308.8; Sep. 20, 2017; 4 pages.
JP Office Action for Application No. 2016-151188; dated Aug. 31, 2017; 10 pages (w/English Translations).
CA Examiner's Requisition for App. No. 2518012; Jul. 26, 2012; 3 pages.
CA Examiner's Requisition for App. No. 2518012; Feb. 19, 2016; 4 pages.
CA Appeal Board Decision for App. No. 2518012; Feb. 22, 2018; 4 pages.
AU Exam Report for Application No. 2016204049 dated Aug. 21, 2017; 4 pages.

* cited by examiner

CONTROLLING TRADERS FROM MANIPULATING ELECTRONIC TRADING MARKETS

CROSS-REFERENCE TO RELATED APPLICATIONS

This application is a continuation of U.S. patent application Ser. No. 12/335,951, filed Dec. 16, 2008 (now issued as U.S. Pat. No. 8,738,501), which is a continuation of U.S. patent application Ser. No. 12/031,843, filed Feb. 15, 2008 (now issued as U.S. Pat. No. 8,725,623), which is a divisional of U.S. patent application Ser. No. 09/851,848, filed May 9, 2001 (now issued as U.S. Pat. No. 7,392,217), each of which is hereby incorporated herein by reference in its entirety.

BACKGROUND OF THE INVENTION

This invention relates to electronic trading markets. More particularly, this invention relates to ways to control the extent to which traders can manipulate electronic trading markets.

As electronic trading becomes more popular, there is an increasing need to control the extent to which traders can manipulate and abuse electronic trading markets. Currently, the trading of fixed-income securities, such as United States Treasuries, United Kingdom Gilts, European Government Bonds, and Emerging Market debts, and non-fixed income securities, such as stocks, is possible through electronic trading systems.

In one method of electronic trading, bids and offers are submitted by traders to a trading system. A bid indicates a desire to buy while an offer indicates a desire to sell. These bids and offers are then displayed by the trading system to other traders. The other traders may respond to these bids and offers by submitting sell (or hit) or buy (or lift or take) commands to the trading system. Once a bid or offer has been responded to by a sell or buy command, a trade has been executed.

Electronic trading can be conducted over any suitable communication system. For example, networked computers can be used to implement a trading system. Traders can submit bid, offer, hit, or lift commands via any suitable input device, such as a mouse, keyboard, or any other suitable device.

Electronic timers are sometimes used in electronic trading systems. In certain systems, a "trade-state" timer may be used to provide a period of exclusivity for two traders (called "current workers") who are "working-up" a trade—i.e., adding size to a pending series of trades. This trade-state timer may be set to a predetermined time period. For example, for U.S. Treasuries, the trade-state timer may be set to twelve seconds. During a work-up trade, the current workers may have a right of first refusal to trade at a certain level. A current worker may submit a bid or an offer anytime during this trade state. However, during this period, no other trader may submit a bid or offer, or respond with a sell or buy command In some systems, "bid-offer" timers may be used to prevent traders from prematurely canceling bids and offers entered by the traders. The timers may give other traders an opportunity to respond to the bids and offers before they can be cancelled by the traders that submitted them. The timers may be set to a predetermined period. For example, in U.S. Treasuries, the bid-offer timer may be preferably set to four seconds. The bid-offer timer may begin when a trader has submitted a bid or offer to the trading system.

When these timers are used together in an electronic trading system, a bid-offer timer may begin when a current worker submits a bid or offer during a work-up trade. The submission of the bid or offer may be timed so that the bid-offer timer expires just prior to the time that the trade-state timer expires. Immediately upon expiration of the trade-state timer, the former current worker may then replace the current bid or offer with a lower bid or offer. At the same time, another trader may submit a sell or buy command in response to the current worker's first bid or offer. Since the current worker has replaced the first bid or offer, the new trader may unintentionally end up selling or buying at a different level than was expected. By canceling the earlier bid or offer and submitting a new bid or offer in order to deceive the new trader, the current worker is said to be "gaming" the market.

Many current trading markets allow traders to "game" the market. As explained above, one form of gaming is done by submitting a bid or offer to the market only to quickly replace it with a new bid or offer. This can be accomplished by manipulating the market timers.

The bids or offers may be any trade type. These may include all-or-none (AON), limit order (LMT), market order (MKT), market-if-touched (MIT), stop-order (STP), etc. More common in gaming is submitting a market order as a first bid or offer and then canceling and replacing the market order with a limit order. A market order buys or sells at the current trading price while a limit order buys or sells at a stated price or better off the current market.

In view of the foregoing, it would be desirable to provide systems and methods for controlling a trader's ability to manipulate electronic trading markets.

SUMMARY OF THE INVENTION

It is an object of this invention to provide systems and methods for controlling a trader's ability to manipulate electronic trading markets.

For background purposes only, a trading interface for an electronic trading system that may be used in accordance with the present invention is illustrated in Kirwin et al. U.S. patent application Ser. No. 09/745,651, filed Dec. 22, 2000, which is hereby incorporated by reference herein in its entirety.

In accordance with this invention, a variety of approaches to control gaming during electronic trading may be used. One approach compares a price difference between two bids or offers. A second approach manipulates the bid-offer and trade-state timers.

More particularly, the price approach may compare the prices of the new and old bids or offers by a trader upon receiving a request to replace a bid or offer. If the change in price is greater than some predetermined value set by the trading system, the trading system may only permit the bid or offer to be replaced by first entering a "cooling off" period. During this cooling off period, any attempt to sell or buy in response to the bid or offer may be suspended. In this way, a new trader has an opportunity to see the price change before submitting a sell or buy command. As an alternative, if the change in price is too great, the new bid or offer may be automatically removed from the market.

The time approach links the timeout of the bid-offer timer to the end of the trade-state timer, rather than the time when a bid or offer was submitted. In this approach, the bid-offer timer may be programmed to count down upon completion of the trade-state timer if a current worker submitted a bid or offer during the trade state. During this time, a new trader (seller or buyer) may respond to the bid or offer, and the current worker cannot cancel or replace the bid or offer during the trade-state timer or during the bid-offer timer.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides systems and methods for controlling gaming in electronic trading systems. One approach involves detecting a change in price between two bids or offers by the same trader and suspending trading for a predetermined amount of time if the price difference is too large, or removing the new bid or offer from the trading system. Another approach involves preventing a trader from canceling or replacing a bid or offer for a predetermined amount of time by linking the timers associated with entry and modifications of bid, offer, sell, and buy commands.

Figure 1:
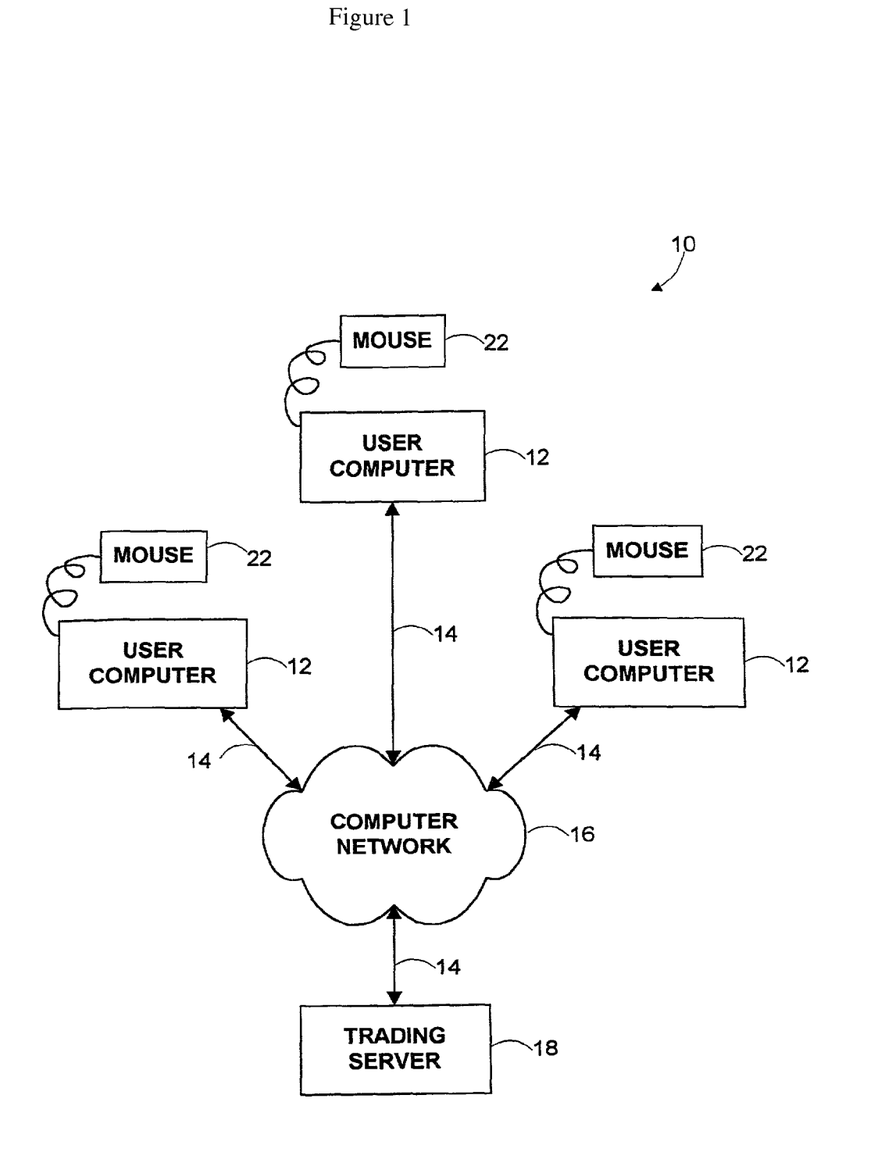
FIG. 1 is a hardware implementation of an exemplary embodiment of an electronic trading system in accordance with the present invention.

FIG. 1 illustrates one embodiment of an electronic trading system 10 according to the present invention. As shown, system 10 may include one or more user computers 12, each of which may include a mouse 22, that are connected by one or more communication links 14 and a computer network 16 to a trading server 18.

In system 10, trading server 18 may be a processor, a computer, a data processing device, or any other suitable server. User computer 12 may be a computer, processor, personal computer, computer terminal, personal digital assistant, a combination of such devices, or any other suitable data processing device. Mouse 22 may be any suitable pointing device capable of receiving user input. Computer network 16 may be any suitable network, including the Internet, an intranet, a wide area network (WAN), a local area network (LAN), a wireless network, a digital subscriber line (DSL) network, a frame relay network, an asynchronous transfer mode network (ATM), a virtual private network (VPN), etc. Communication links 14 may be any suitable communication links for communicating data between user computers 12 and trading server 18, such as network links, dial-up links, wireless links, hard-wired links, etc.

All trading interactions between user computers 12 preferably occur via computer network 16, trading server 18, and communication links 14. Traders at user computers 12 may conduct trading transactions using mice 22, keyboards, or any other suitable devices.

Figure 2:
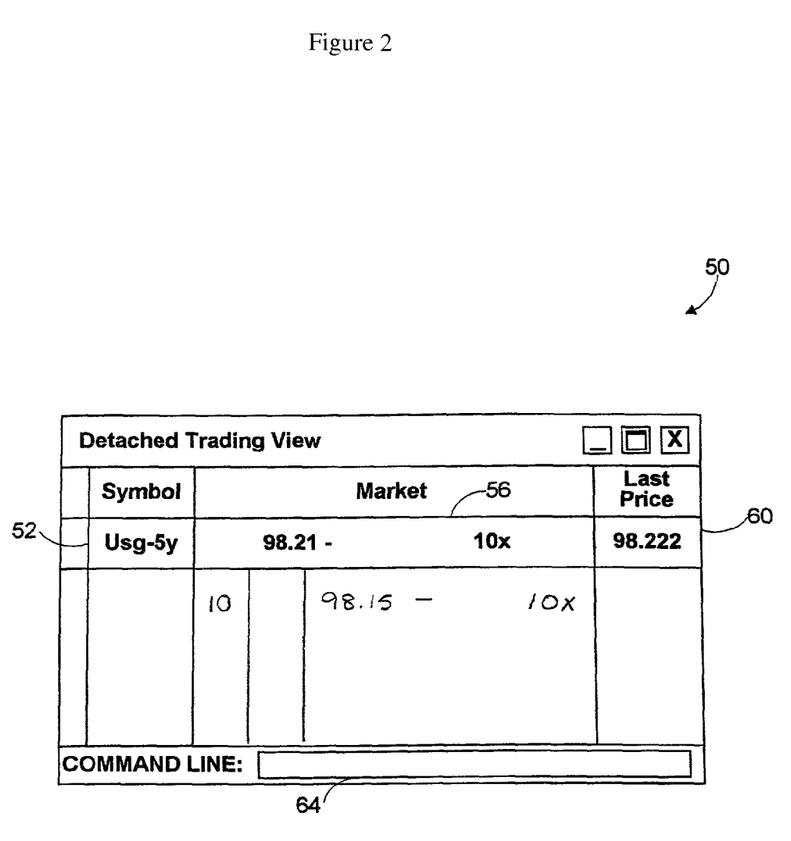
FIG. 2 illustrates a detached trading view of a market cell containing a bid in accordance with the present invention.
Figure 3:
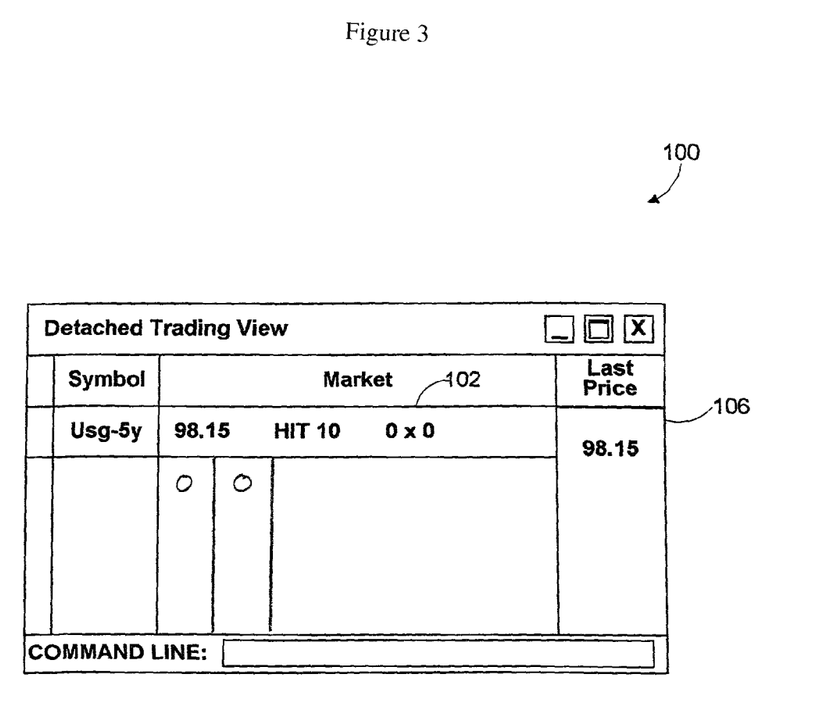
FIG. 3 illustrates a detached trading view of a market cell when a trader has gamed the market in trading systems prior to the present invention.
Figure 4:
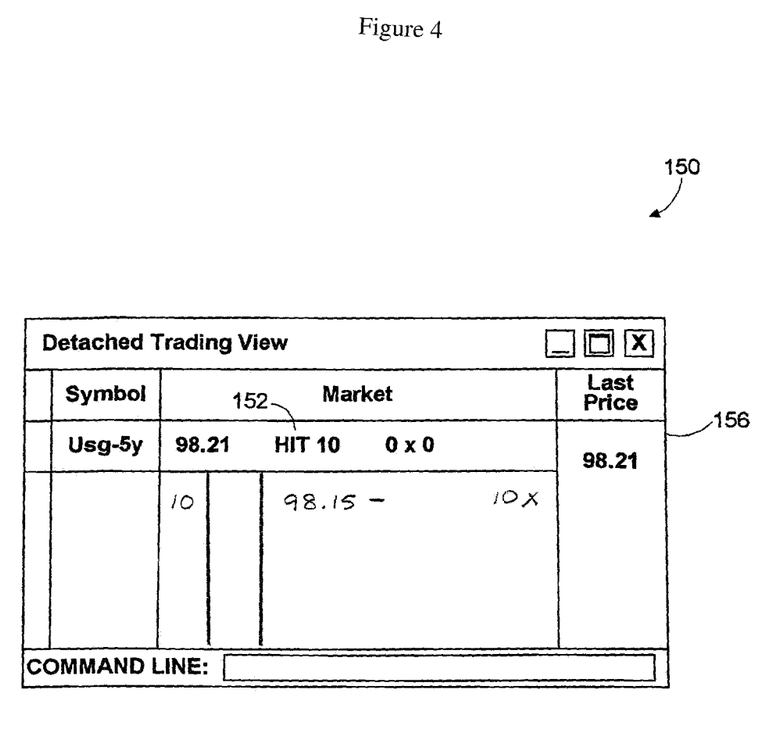
FIG. 4 illustrates a detached trading view of a market cell when a seller responds to a bid in accordance with the present invention.

FIGS. 2-4 illustrate market cells that may be displayed on a user computer 12 in accordance with the present invention. A market cell may include indications of the item to be traded, pending bids and/or offers for the item, the last trading price, and a field for entering trade commands. For ease of description, FIGS. 2-4 will be described in terms of bids although the same applies for offers as well.

FIG. 2 illustrates a detached trading view of a market cell 50 containing a market order bid entered by a trader for an item. As shown, a symbol 52 for the item to be traded (e.g., usg-5y) may be indicated. As also shown, the trader may have entered a market order bid 56 having a price of 98.21 for $10 million in 5 year bonds as well as a limit order bid 58 having a price of 98.14 for the same amount. The last trading price 60 for the item (e.g., 98.222) may also be indicated. "Command Line" 64 may be used by a trader to enter a bid, offer, sell, buy, cancel, or replace command, or any other suitable command. These commands may be entered using text, using dedicated buttons, or using any other suitable approach to execute trade commands.

FIG. 3 illustrates a detaching trading view of market cell 100 after a trader has gamed the market. Using the existing electronic trading system, a trader can manipulate the timers to replace market order bid 56 in FIG. 2 with the limit order bid 102 (bid 58 in FIG. 2) having a price of 98.15. Unaware of this change, a seller thinks he or she is responding to the 98.21 bid when he or she is actually responding to the 98.15 bid. The new price is indicated in last price column 106.

FIG. 4 illustrates a detached trading view of a market cell 150 when a trader tries to cancel or replace bid 56 prior to a seller responding to the bid. Under the present invention, a trader who tries to cancel or replace a bid will either be prevented from changing the bid for a predetermined time period or trading for the item will be suspended, giving a potential seller notice of the new bid.

If a bid cannot be canceled for a predetermined time period, a seller may hit the bid as indicated by indicator 152. As shown, the seller has sold $10 million of usg-5Y at a price of 98.21. The new trading price is reflected in the last price column 156.

Figure 5:
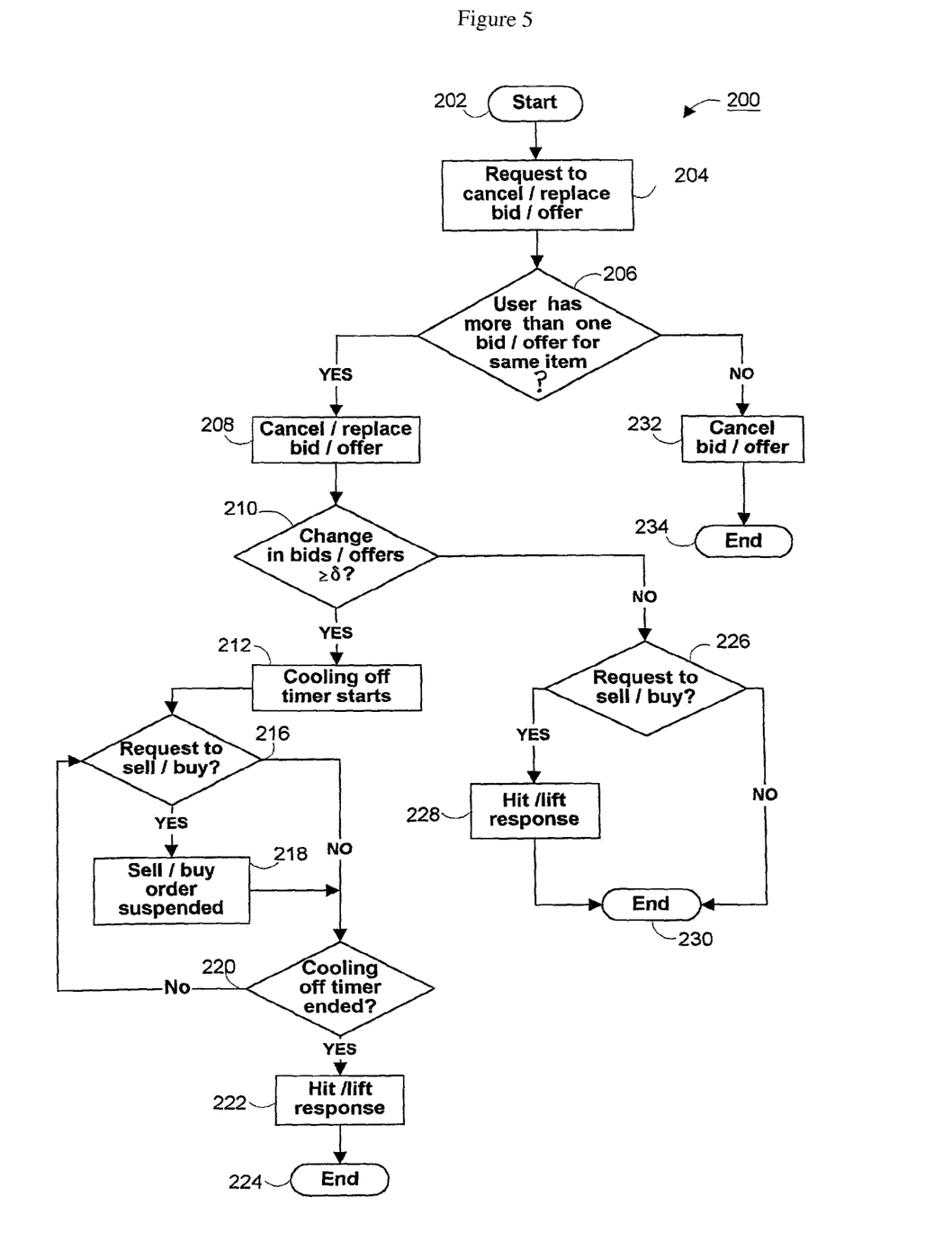
FIG. 5 is a flow diagram of an exemplary embodiment of a price approach in accordance with the present invention.

FIG. 5 is a flow diagram of a price approach to prevent gaming in accordance with the present invention. Process 200 begins at step 202 with one or more bids or offers already entered in the trading system. A bid or offer can be a market order, a limit order, any other type of order, or any combination of orders. At step 204, the trading system may receive a request to cancel or replace a bid or offer. Next, at step 206, the trading system may determine whether the trader has more than one order for the same item.

If the trader has more than one order, the trading system takes steps to prevent possible gaming. At step 208, the trading system cancels the first bid or offer and replaces it with the second bid or offer. Next, at step 210, the trading system compares the price of the canceled bid or offer with the new bid or offer. If the price change in the bids or offers is greater than some delta (e.g., {fraction (1/32)}nd, or any other suitable price difference), process 200 moves to step 212 where a cooling off period timer starts. During this cooling off period, if the trading system receives a request to sell or buy at step 216, the sell or buy order is suspended at step 218 to give the seller or buyer notice of a change in bid or offer price.

After suspending the sell or buy order, or if the trading system has not received a request to sell or buy, process 200 checks whether the cooling period has ended at step 220 and if not, process 200 moves back to step 216. The cooling off period may last any suitable amount of time (e.g., 2 seconds). If the cooling period has ended at step 220, the new bid or offer is updated on the trading system and a seller or buyer can respond with a hit or lift at step 222. Once a hit or lift is received, a trade occurs and process 200 ends at step 224.

If the price change in bids or offers at step 210 is not greater than the predetermined delta, process 200 moves to step 226 where the trading system checks for a request to sell or buy. If there is a request to sell or buy (i.e., a seller or buyer responds with a hit or lift response) at step 228, then a trade occurs and process 200 ends at step 230. Process 200 may also end at step 230 immediately after step 226 if there is no request to sell or buy.

If the trading system determines that a user does not have more than one bid or offer for the same item at step 206, process 200 cancels the bid or offer at step 232. Since the trader no longer has a bid or offer in the market, process 200 ends at step 234.

Figure 6:
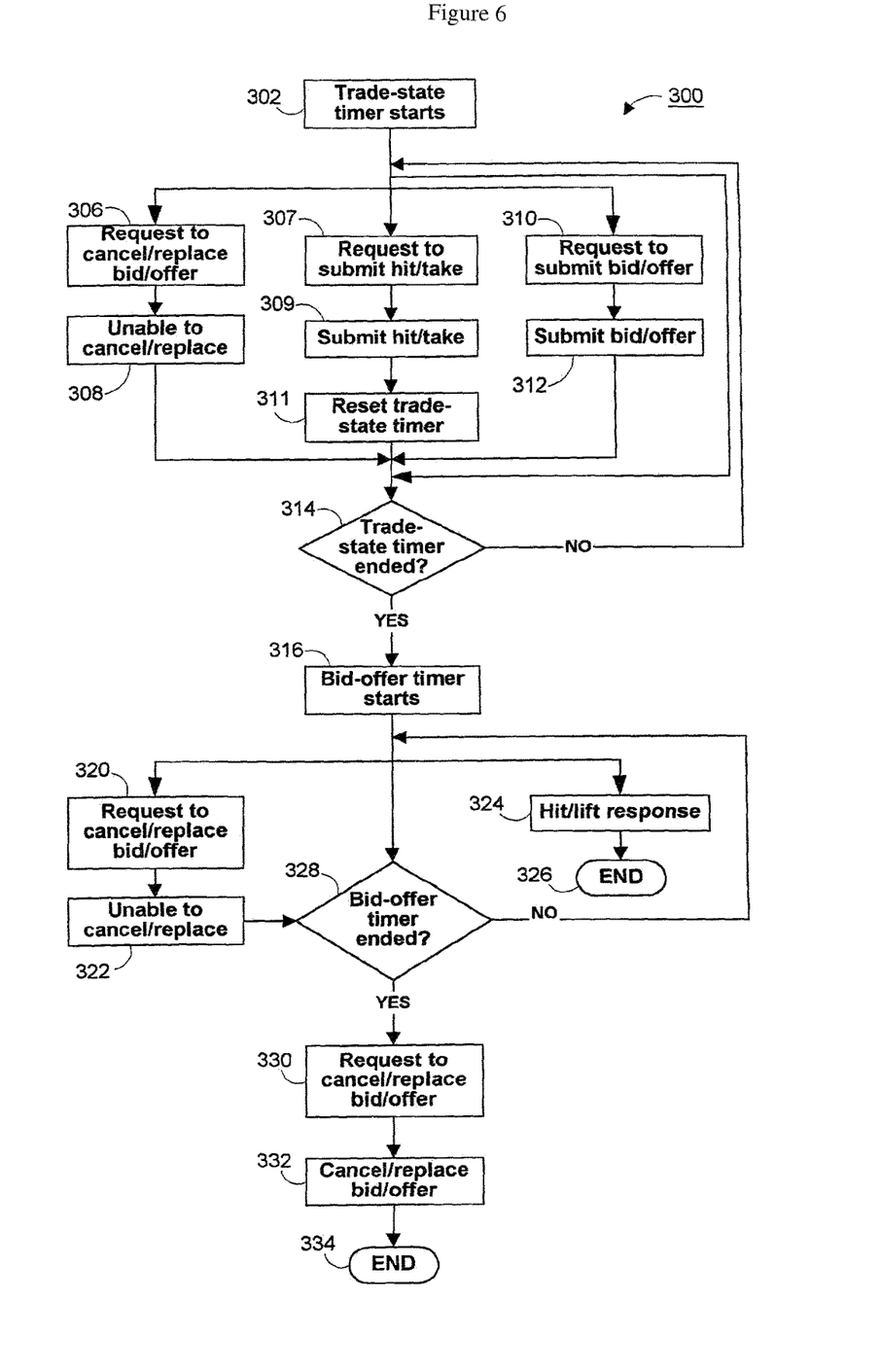
FIG. 6 is a flow diagram of an exemplary embodiment of a timing approach in accordance with the present invention.

FIG. 6 is a flow diagram of a timing approach to control gaming according to the present invention. Process 300 begins at step 302 by starting a trade-state timer. At this point, the trading system for a particular item has entered a trade state. During this trade state several events may occur. One event may be a request to cancel or replace a current bid or offer at step 306. If this occurs, the trader will be prevented from canceling or replacing the bid or offer, and a pop-up window may be displayed on the trader's screen indicating that he or she cannot cancel or replace the bid or offer until the trade state is over at step 308. A second event may be a request to submit a hit or take at step 307. If this occurs, a second trader will be able to submit a hit or take in response to the bid or offer at step 309. Then at step 311, the trading system will reset the trade-state timer. A third event may be a request to submit a bid or offer at step 310. If this occurs, a trader will be able to submit a bid or offer at step 312. If the trader currently has a bid or offer in the market, submitting a new bid or offer will not replace or cancel the existing bid or offer.

After step 308, 311, or 312, or directly after step 302 (if none of the requests indicated in steps 306, 307, and 310 are made), process 300 moves to step 314 where the trading system determines whether the trade-state timer has ended. If the trade-state timer has not ended, process 300 remains in the trade state to wait for a request to cancel or replace an order at step 306, a request to submit a hit or take at step 307, a request to submit a bid or offer at step 311, or for the timer to end at step 314. If the trade-state timer has ended, process 300 moves to step 316 where the bid-offer timer starts. At this point, process 300 is in a bid-offer state. During the bid-offer state (e.g., 4 seconds or any other suitable time period), one of several things can occur. If process 300 receives a hit or lift response from a seller or buyer, a trade will occur at the bid or offer price made during the trade state at step 324. Process 300 will then end at step 326.

During the bid-offer state, process 300 can receive a request to cancel or replace an order at step 320. If this occurs, similar to the trade state, the trader will be prevented from canceling or replacing the order, and a pop-up window, or any other suitable method, may be used to communicate this message to the trader at step 322.

After step 322, or directly after step 316, process 300 may determine whether the bid-offer timer has ended at step 328. If the timer has not ended, process 300 may remain in the bid-offer state to wait for a request to cancel or replace a bid or offer at step 320, for a hit or lift response at step 324, or for the timer to end at step 328. If the bid-offer timer has ended, process 300 may then receive a request to cancel or replace an order at step 330. If such a request is received, the bid or offer will be canceled and will be replaced by a new bid or offer at step 332. Process 300 may then end at step 334.

Gaming may be controlled to prevent as well as to promote gaming. Gaming may be promoted by creating liquidity in an illiquid market (e.g., by controlling and encouraging gaming to whatever degree the market will permit). An example for increasing liquidity may be to take an illiquid security, such as an old bond (e.g., 30 year United States Treasury bond), and permit gaming so that trades increase. The permitted sale may be based on a sliding scale of various elements that are controlled. The permitted sale may also occur by permitting the trade to increase until a specific volume is attained, or by generally permitting gaming for specific securities (such as the old bond) in illiquid markets.

Thus it is seen that systems and methods are provided to control gaming in electronic trading systems. One skilled in the art will appreciate that the present invention can be practiced by other than the described embodiments, which are presented for purposes of illustration and not of limitation, and the present invention is limited only by the claims which follow.

What is claimed is:

1. A method for controlling manipulation of an electronic trading market, comprising the steps of:

providing, via a processor, an exclusive trading period wherein only a first trader is allowed to submit a bid or offer and a second trader is allowed to submit a hit or take;

generating, via the processor, electrical signals to generate commands to render (1) a first graphical window on a first graphical user interface of a first computing device of the first trader to only allow the first trader to submit a bid or offer, and (2) a second graphical window on a second graphical user interface of a second computing device of the second trader to allow the second trader to submit a hit or take;

automatically providing, via the processor, a bid-offer period upon completion of the exclusive trading period, during which the processor prevents the first trader from canceling or replacing a submitted bid or offer;

during the bid-offer period, automatically generating, via the processor, electrical signals to generate commands to render a first graphical object to overlay the first graphical window on the first graphical user interface of the first computing device of the first trader to prevent the first trader from canceling or replacing a submitted bid or offer; and after the bid-offer period, automatically generating, via the processor, electrical signals to generate commands to withdrawal the first graphical object from over the first graphical window on the first graphical user interface of the first computing device of the first trader to allow the first trader to cancel or replace a submitted bid or offer.

2. The method of claim 1, wherein during the bid-offer period the processor prevents the first trader from replacing the bid or offer.

3. The method of claim 1 wherein during the exclusive trading period, the processor allows the first trader to submit multiple bids or offers.

4. The method of claim 1 further comprising the steps of: restarting the exclusive trading period upon the second trader submitting a hit or take.

5. The method of claim 1, wherein during the bid-offer period the processor prevents the first trader from canceling the bid or offer.

6. The method of claim 1 further comprising allowing the second trader to respond to the bid or offer with a hit or take during the bid-offer period.

7. The method of claim 1 further comprising allowing the first trader to cancel or replace the bid or offer upon completion of the bid-offer period.

8. A system for controlling manipulation of an electronic trading market by a trader comprising:
   a tangible memory storing programs to instruct a trading server to:
      provide an exclusive trading period wherein a first trader is allowed to submit a bid or offer and a second trader is allowed to submit a hit or take,
      generate electrical signals to generate commands to render (1) a first graphical window on a first graphical user interface of a first computing device of the first trader to only allow the first trader to submit a bid or offer, and (2) a second graphical window on a second graphical user interface of a second computing device of the second trader to allow the second trader to submit a hit or take;
      provide a bid-offer period that starts automatically upon completion of the exclusive trading period, during which the trading server prevents the first trader from canceling or replacing a submitted bid or offer;
      during the bid-offer period, automatically generate electrical signals to generate commands to render a first graphical object to overlay the first graphical window on the first graphical user interface of the first computing device of the first trader to prevent the first trader from canceling or replacing a submitted bid or offer; and
      after the bid-offer period, automatically generate electrical signals to generate commands to withdrawal the first graphical object from over the first graphical window on the first graphical user interface of the first computing device of the first trader to allow the first trader to cancel or replace a submitted bid or offer.

9. The system of claim 8 wherein the programs instruct the trading server to restart the exclusive trading period upon the second trader submitting a hit or take.

10. The system of claim 8 wherein the programs instruct the trading server to, during the bid-offer period, prevent the first trader from replacing the bid or offer.

11. The system of claim 8 wherein the programs instruct the trading server to, during the bid-offer period, allow the second trader to respond to the bid or offer with a hit or take.

12. The system of claim 8 wherein the programs instruct the trading server to allow the first trader to cancel or replace the bid or offer upon completion of the bid-offer period.

13. A method, comprising the steps of:
   receiving at the at least one computing device a first order for an item from a first trader;
   receiving at the at least one computing device a second order for the item from the workstation associated with the first trader;
   receiving at the at least one computing device a request to cancel the first order for the item;
   starting with the at least one computing device a cooling off period based on receipt of the request to cancel the first order and based on a difference between a price of the first order and a price of the second order being greater than a predetermined amount;
   receiving at the at least one computing device, from the workstation associated with the second trader, during the cooling off period, an order to buy or sell the item, the order from the second trader counter side to the first order and the second order from the first trader;
   suspending with the at least one computing device the order to buy or sell the item from the second trader, as a result of the buy or sell order being received during the cooling off period, and for a period of time for the second trader to notice a change in the first order and the second order prices;
   generating electrical signals to generate commands to render (1) a first graphical window on a first graphical user interface of a first workstation of the first trader to only allow the first trader to submit a bid or offer, and (2) a second graphical window on a second graphical user interface of a second workstation of the second trader to allow the second trader to submit a hit or take;
   during a bid-offer period, automatically generating electrical signals to generate commands to render a first graphical object to overlay the first graphical window on the first graphical user interface of the first workstation of the first trader to prevent the first trader from canceling or replacing a submitted bid or offer; and
   after the bid-offer period, automatically generating electrical signals to generate commands to withdrawal the first graphical object from over the first graphical window on the first graphical user interface of the first workstation of the first trader to allow the first trader to cancel or replace a submitted bid or offer.

14. The method of claim 13 comprising canceling with the at least one computing device the first order, the second order thereby replacing the first order.

15. The method of claim 14 comprising executing with the at least one computing device the order to buy or sell the item against the second order after the cooling off period.

16. The method of claim 15, comprising communicating with the at least one computing device the price of the second order to the workstation associated with the second trader, and receiving at the at least one computing device a hit or lift from the workstation associated with the second trader after the cooling off period.

17. The method of claim 13, comprising executing with the at least one computing device the order to buy or sell the item against the second order without suspending the order to buy or sell the item when the price difference between the first order and the second order is less than the predetermined amount.

18. The method of claim 13, wherein at least one of the first and the second orders are submitted during a period wherein at least one of the first trader and the second trader has exclusivity.

19. The method of claim 13, wherein at least one of the first and the second orders are submitted during a period wherein the first trader cannot cancel bids or offers.

20. A trading system comprising at least one computing device coupled over a network to at least a workstation associated with a first trader and a workstation associated with a second trader, the at least one computing device comprising software that when executed causes the at least one computing device to:

receive a first order for an item from the workstation associated with a first trader;

receive a second order for the item from the workstation associated with a first trader;

receive a request to cancel the first order for the item;

start a cooling off period based on receipt of the request to cancel the first order and when a difference between a price of the first order and a price of the second order is greater than a predetermined amount;

receive from the workstation associated with a second trader, during the cooling off period, an order to buy or sell the item, the order from the second trader counter side to at least one of the first order and the second order from the first trader;

suspend the order to buy or sell the item from the second trader, as a result of the buy or sell order being received during the cooling off period, and for a period of time for the second trader to notice a change in the first order and the second order prices;

generate electrical signals to generate commands to render (1) a first graphical window on a first graphical user interface of a first workstation of the first trader to only allow the first trader to submit a bid or offer, and (2) a second graphical window on a second graphical user interface of a second workstation of the second trader to allow the second trader to submit a hit or take;

during a bid-offer period, automatically generate electrical signals to generate commands to render a first graphical object to overlay the first graphical window on the first graphical user interface of the first workstation of the first trader to prevent the first trader from canceling or replacing a submitted bid or offer; and     after the bid-offer period, automatically generate electrical signals to generate commands to withdrawal the first graphical object from over the first graphical window on the first graphical user interface of the first workstation of the first trader to allow the first trader to cancel or replace a submitted bid or offer.

21. The system of claim 20, the software when executed further causes the least one computing device to cancel the first order, the second order thereby replacing the first order.

22. The system of claim 21, the software when executed further causes the at least one computing device to execute the order to buy or sell the item against the second order after the cooling off period.

23. The system of claim 20, the software when executed further causes the at least one computing device to communicate the price of the second order to the workstation associated with the second trader, and receive a hit or lift from the workstation associated with the second trader after the cooling off period.

24. The system of claim 20, the software when executed further causes the at least one computing device to execute the order to buy or sell the item against the second order without suspending the order to buy or sell the item when the price difference between the first order and the second order is less than the predetermined amount.

25. The system of claim 20, wherein at least one of the first and the second orders are submitted during a period wherein at least one of the first trader and the second trader has exclusivity.

26. The system of claim 20, wherein at least one of the first and the second orders are submitted during a period wherein the first trader cannot cancel bids or offers.

27. A method performed by at least one computing device coupled over a network to at least a workstation associated with a first trader and a workstation associated with a second trader, the method comprising:

receiving at the at least one computing device a first order to trade an item;

receiving at the at least one computing device a second order to trade the item, the first and second orders each submitted from the workstation associated with the first trader and each specifying a price;

receiving at the at least one computing device a request to cancel or replace the first order;

determining with the at least one computing device a difference between the price of the first order and the price of the second order;

starting with the at least one computing device a cooling off period based on receipt of the request to cancel or replace the first order and when the difference between the price of the first order and the price of the second order is greater than a predetermined amount;

receiving at the at least one computing device, from the workstation associated with second trader, during the cooling off period, an order to buy or sell the item, the order from the second trader counter side to at least one of the first order and the second order from the first trader;

suspending with the at least one computing device the order to buy or sell the item from the second trader, as a result of the buy or sell order being received during the cooling off period, and for a period of time for the second trader to notice a change in the first order and the second order prices;

receiving at the at least one computing device a command accepting the second order from the second trader;

executing with the at least one computing device the order to buy or sell the item against the second order in response to the acceptance command;

generating electrical signals to generate commands to render (1) a first graphical window on a first graphical user interface of a first workstation of the first trader to only allow the first trader to submit a bid or offer, and (2) a second graphical window on a second graphical user interface of a second workstation of the second trader to allow the second trader to submit a hit or take;

during a bid-offer period, automatically generating electrical signals to generate commands to render a first graphical object to overlay the first graphical window on the first graphical user interface of the first workstation of the first trader to prevent the first trader from canceling or replacing a submitted bid or offer; and     after the bid-offer period, automatically generating electrical signals to generate commands to withdrawal the first graphical object from over the first graphical window on the first graphical user interface of the first workstation of the first trader to allow the first trader to cancel or replace a submitted bid or offer.

\* \* \* \* \*